United States Patent

Brantley

[11] Patent Number: 5,782,078
[45] Date of Patent: Jul. 21, 1998

[54] TAPERED JAM NUT FOR TURBINE FRAME MOUNT LINK

[75] Inventor: James W. Brantley, Fairfield, Ohio

[73] Assignee: General Electric Company, Cincinnati, Ohio

[21] Appl. No.: 768,265

[22] Filed: Dec. 17, 1996

[51] Int. Cl.⁶ ........................................... F02C 7/20
[52] U.S. Cl. ............................. 60/39.31; 248/555; 403/46
[58] Field of Search ........................... 60/226.1, 39.31; 244/54; 248/554, 555; 403/43, 46

[56] References Cited

U.S. PATENT DOCUMENTS

| | | |
|---|---|---|
| 632,422 | 9/1899 | McLaughlin . |
| 783,572 | 2/1905 | Gibbs . |
| 1,016,835 | 2/1912 | Levy-Maurice ............... 403/46 |
| 1,346,730 | 7/1920 | Viebrock et al. . |
| 1,470,528 | 10/1923 | Flentjen . |
| 1,717,789 | 6/1929 | Larrad . |
| 1,928,982 | 10/1933 | Rosenbaum . |
| 2,936,978 | 5/1960 | Lauck ............... 248/555 |
| 3,295,764 | 1/1967 | Geary et al. . |
| 4,571,936 | 2/1986 | Nash et al. . |

FOREIGN PATENT DOCUMENTS 714774 9/1954 United Kingdom ............... 403/46

*Primary Examiner*—Louis J. Casaregola
*Attorney, Agent, or Firm*—Andrew C. Hess; Patrick R. Scanlon

[57] ABSTRACT

A link for supporting a core engine within an outer shell of a gas turbine engine is described. The link, in one form, includes an elongate rod having a first end and a second end, and first and second rod end bearings are secured at the first second ends, respectively. Each end bearing includes a bearing head and a threaded stud extending from the head. The elongate rod includes a first threaded socket located at first rod end and sized to be engaged to the first rod end bearing stud, and a second threaded socket located at second rod end and sized to be engaged to the second rod end bearing stud. The first and second tapered jam nuts are located at the first and second ends of rod. Each tapered jam nut includes a nut end having, for example, a hexagonal head and a tapered portion extending from the nut end. A bore extends through each tapered jam nut, and the bore is sized to have the stud extend therethrough. The bore has internal threads at least at the location of nut end. Each socket includes a coaxial countersunk portion for receiving the tapered portion of respective jam nuts. As each jam nut is tightened in threaded engagement with one of the sockets, a clamping force is created between the socket, the jam nut, and the rod end bearing stud. In addition, the jam nut threads are be more highly stressed in the axial direction than the taper material in the radial direction. The threads are allowed to yield and redistribute the thread loads to adjacent threads without loosening the clamping load in tapered portion of the jam nut.

8 Claims, 1 Drawing Sheet

TAPERED JAM NUT FOR TURBINE FRAME MOUNT LINK

GOVERNMENT RIGHTS

The United States Government has rights in this invention pursuant to Contract No. F33657-86-2040 awarded by the Department of the Air Force.

FIELD OF THE INVENTION

This invention relates generally to gas turbine engines and more particularly, to mount links for securing the core engine of a gas turbine engine.

BACKGROUND OF THE INVENTION

In an aircraft engine, the jet engine is supported within a circumferential outer shell by a plurality of links. The links, in addition to supporting the engine, also preferably minimize drag and turbulence in the high-velocity stream of air flowing between the engine and the outer shell. The jet engine in this arrangement is sometimes referred to as the core engine.

The core engine is completely surrounded by the housing with only a relatively small and preferably precisely defined annular space between the core engine and the outer shell with the links absorbing only uniaxial loads. The objective is to rigidly support the core engine in the radial plane only allowing axial thermal expansion between the core engine and the outer shell. Therefore, the links must be capable of withstanding axial forces directed along the link axes and oppose complex rotational or torque forces resulting from engine operation. The links must also minimally impede the flow of fan air through the housing annular space. The links also preferably are easily adjusted over the life of the engine, and also preferably do not impede removing portions of the engine for maintenance and repair purposes.

Known links for supporting the core engine include rod ends locked in position by conventional self locking jam nuts. The links have an elliptical geometric shape, and each link typically is oriented between the core engine and the outer shell so that the major axis of each link elliptical cross section is substantially parallel to air flow. Such orientation provides a minimum resistance to air flow.

Thermal loading, combined with maneuver loading, places a compressive load on the links. This operational loading is in addition to the preloading developed in the jam nut at installation. The initial preload produces stress near the yield strength of the nut. If the additional operating loading exceeds the yield strength of the nut by a significant amount, the preload on the jam nut may be lost. Then, at less than maximum loading, the jam nut no longer locks the link in position and the elliptical link may rotate. If the link rotates relative to the air flow, the elliptical link causes a drag wake greater than if the link maintains its original orientation as described above. Although the rotated elliptical link results in increased drag as described above, at least with an elliptical link, further rotation of the link is substantially prevented due to the geometric shape of the link contacting other hardware.

With round links, once such links begin to turn, such links are free to continue to turn. Of course, if a link rotates, or turns, a sufficient number of time, the set up length of the link changes. Such unwanted change in the set up length of the link is undesirable since the core engine may not be supported within the outer shell at the desired location. In addition, if the round link rotates even more, the link may separate and provide no support for the core engine. Such a condition also, of course, is undesirable.

It would be desirable to prevent the link jam nut from losing its preload under a wide range of operating conditions. It also would be desirable to maintain the link in a locked position once the link is installed at a desired orientation.

SUMMARY OF THE INVENTION

These and other objects may be attained by a link including tapered jam nuts in accordance with the present invention. Specifically, in one form, the link includes an elongate rod having a first end and a second end, and first and second rod end bearings are secured at the first and second ends, respectively. Each end bearing includes a bearing head and a threaded stud extending from the head. The elongate rod includes a first threaded socket located at first rod end and sized to be engaged to the first rod end bearing stud, and a second threaded socket located at second rod end and sized to be engaged to the second rod end bearing stud.

The first and second tapered jam nuts are located at the first and second ends of rod. Each tapered jam nut includes a nut end having, for example, a hexagonal head, a tapered portion extending from the nut end, and a threaded bore extending through each tapered jam nut. The bore is sized to have the stud extend therethrough. The bore has internal threads at least at the location of nut end.

Each socket includes a coaxial countersunk portion for receiving the tapered portion of respective jam nuts. As each jam nut is tightened in threaded engagement with one of the sockets, a clamping force is created between the socket, the jam nut, and the rod end bearing stud. In addition, the jam nut threads are more highly stressed in the axial direction than the taper material in the radial direction. The threads are allowed to yield and redistribute the thread loads to adjacent threads without loosening the clamping load in tapered portion of the jam nut.

With the above described configuration, the preload on the jam nuts is not lost in the event that a compressive load is placed on the link. Specifically, and as described above, since the jam nut threads are allowed to yield and redistribute the thread loads without loosening the clamping load, such compressive load on the link will not result in a loss of the preload. In addition, this configuration will maintain the link locked in position as installed.

DETAILED DESCRIPTION OF THE DRAWINGS

Figure 1:
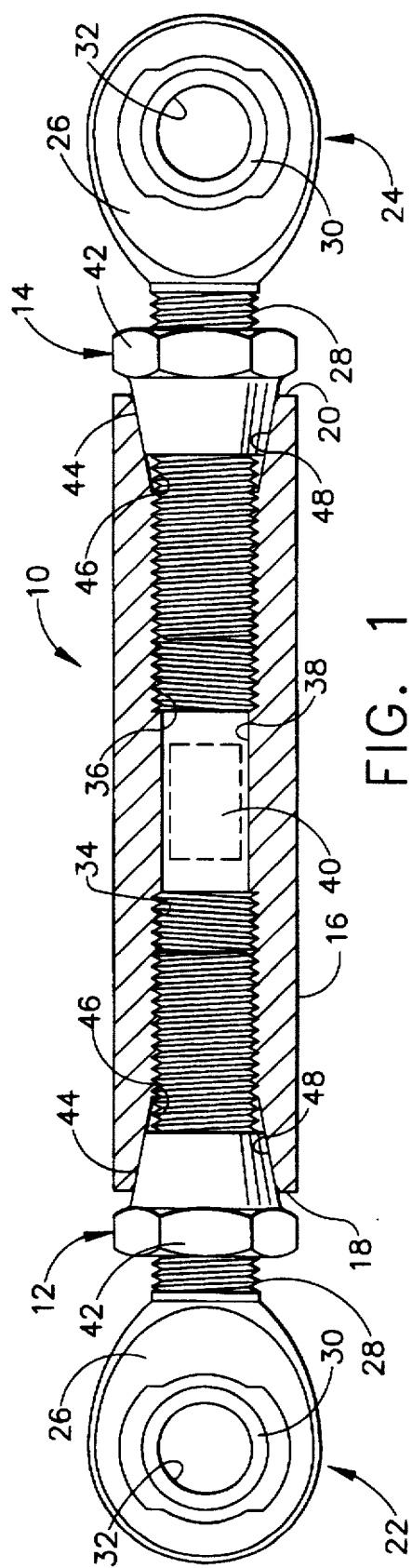
FIG. 1 is a top view of a link including tapered jam nuts in accordance with one embodiment of the present invention.

FIG. 1 is a top view of a link 10 including first and second tapered jam nuts 12 and 14 in accordance with one embodiment of the present invention. Specifically, link 10 includes an elongate rod 16 having a first end 18 and a second end 20, and first and second rod end bearings 22 and 24 secured at first end 18 and second end 20, respectively. Each end bearing 22 and 24 includes a bearing head 26 and a threaded stud 28 extending from head 26. Each bearing head 26 includes an annular shaped bearing 30 having an opening 32 therein so that bearing head 26 can be secured, such as by bolts, to components of the core engine and the outer shell of an aircraft engine, for example.

Elongate rod 16 includes a first threaded socket 34 located at first rod end 18 and sized to be engaged to first rod end bearing stud 28, and a second threaded socket 36 located at second rod end 20 and sized to be engaged to second rod end bearing stud 28. Sockets 34 and 36 are formed in rod 16 by a bore 38 which extends through rod 16 coaxial with the longitudinal axis of rod 16. A wrench flat surface 40 is located on rod 16 between first end 18 and second end 20. Rod 16 may have, for example, an elliptical or circular cross-sectional shape.

First and second tapered jam nuts 12 and 14 are located at first and second ends 18 and 20 of rod 16. Each tapered jam nut 12 and 14 includes a nut end 42 having, for example, a hexagonal head, and a tapered portion 44 extending from nut end 42. A bore 46 extends through each tapered jam nut 12 and 14, and bore 46 is sized to have stud 28 extend therethrough. Bore 46 has internal threads at least at the location of nut end 42 for engaging threads on respective studs 28. Well known self locking nut features may be included at nut end 42. Link rod 16, end bearings 22 and 24, and jam nuts 12 and 14 can be fabricated from metal such as titanium or In 718.

Figure 2:
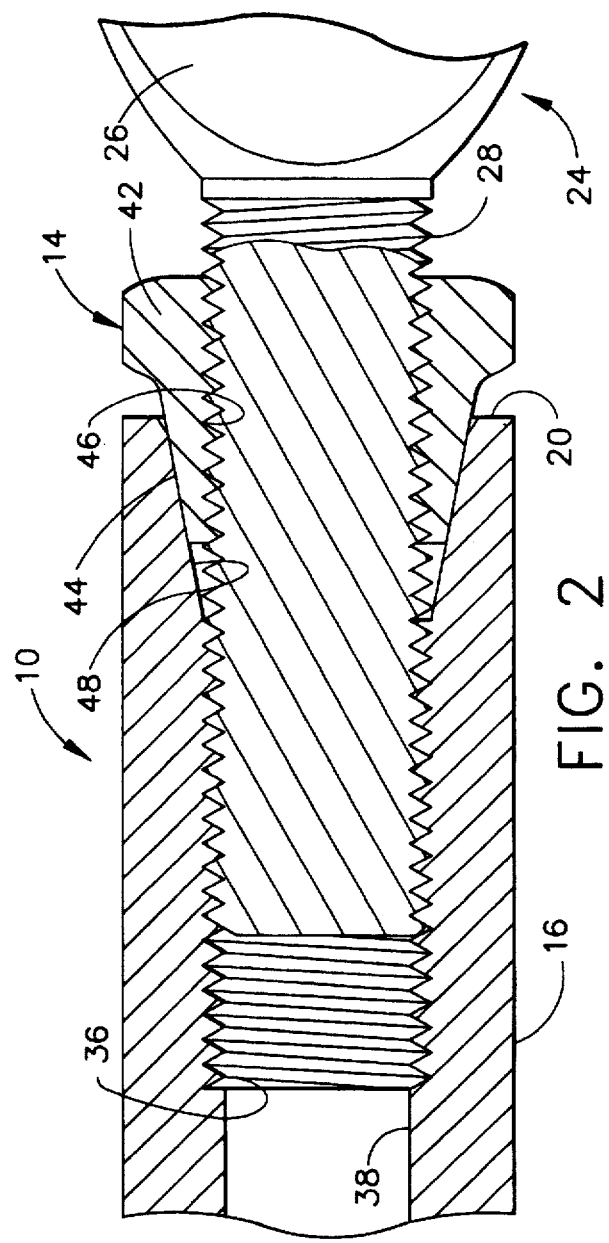
FIG. 2 is a cross sectional view of a portion of a the link shown in FIG. 1.

Referring to FIG. 2, which is a cross sectional view of a portion of link 10 shown in FIG. 1, each socket 34 and 36 includes a coaxial countersunk portion 48 for receiving tapered portion 44 of respective jam nut 12 and 14. To adjust link 10 to a desired length, rod 16 can be turned relative to heads 22 and 24. Non round rod 16 requires the bearing threads to be turned half turns at a time, relative to each other, to maintain orientation for incremental adjustment. In non round rod 16, different threads/inch in opposing sockets 34 and 36 are required as is known. Wrench flat surface 40 is gripped using a wrench to tighten jam nuts 12 and 14 into place at each ends 18 and 20 to maintain the set up length and rod 16 to bearing head 26 orientations with respect to air flow. As each jam nut 12 and 14 is tightened in threaded engagement with respective studs 28, which are in threaded engagement with respective sockets 34 and 36, a clamping force is created between portion 48 of sockets 34 and 36, jam nut 12 and 14, and rod end bearing stud 28. In addition, the jam nut threads will be more highly stressed in the axial direction than the taper material in the radial direction. The jam nut threads are allowed to yield and redistribute the thread loads to adjacent threads without loosening the clamping load in tapered portion 44 of jam nuts 12 and 14.

With the above described configuration, the preload on jam nuts 12 and 14 is not lost in the event that a compressive load is placed on link 10. Specifically, and as described above, since the jam nut threads are allowed to yield and redistribute the thread loads without loosening the clamping load, such compressive load on link 10 will not result in a loss of the preload. In addition, this configuration will maintain link 10 locked in position as installed. Further, these advantages are provided without increasing the number of parts required in the link assembly as compared to the number of parts required with known link assemblies. Therefore, the advantages described above are provided without significantly affecting fabrication and maintenance costs.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A link assembly for supporting a core engine of a gas turbine engine in an outer shell, said link assembly comprising:
   a first rod end bearing comprising a bearing head and a stud extending from said head;
   a first tapered jam nut comprising a nut end and a tapered portion extending from said nut end, and a threaded bore extending through said tapered jam nut, said bore sized to have said bearing stud extend therethrough; and
   an elongate rod comprising a first end and a second end, a threaded socket located at said first rod end and sized to be engaged to said first rod end bearing stud, said threaded socket including a coaxial countersunk portion for receiving said tapered portion of said first jam nut.

2. A link assembly in accordance with claim 1 wherein as said first rod end bearing is tightened in threaded engagement with said socket at said first rod end, a clamping force is created between said socket, said first jam nut, and said first rod end bearing stud.

3. A link assembly in accordance with claim 1 further comprising:
   a second rod end bearing comprising a bearing head and a stud extending from said head;
   a threaded socket located at said second rod end and sized to be engaged to said rod end bearing stud; and
   a second tapered jam nut comprising a nut end and a tapered portion extending from said nut end, and a threaded bore extending through said tapered jam nut, said bore sized to have said bearing stud extend therethrough.

4. A link assembly in accordance with claim 1 wherein said socket at said second rod end comprises a coaxial countersunk portion for receiving said tapered portion of said second jam nut.

5. A link assembly in accordance with claim 1 wherein as said second rod end bearing is tightened in threaded engagement with said socket at said second rod end, a clamping force is created between said socket, said second jam nut, and said second rod end bearing stud.

6. A link assembly in accordance with claim 1 wherein said elongate rod further comprises a wrench flat surface between said first end and said second end.

7. A link assembly comprising:
   first and second rod end bearings, each of said end bearings comprising a bearing head and a stud extending from said head;
   first and second tapered jam nuts, each of said tapered jam nuts comprising a nut end and a tapered portion extending from said nut end, and a threaded bore extending through said tapered jam nut, said bore sized to have one of said respective bearing studs extend therethrough; and
   an elongate rod comprising a first end and a second end, a first threaded socket located at said first rod end and sized to be engaged to said first rod end bearing stud, and a second threaded socket located at said second rod end and sized to be engaged to said second rod end bearing stud, each of said threaded sockets including a coaxial countersunk portion for receiving said tapered portion of said first and second jam nuts.

8. A link assembly in accordance with claim 7 wherein as said first rod end bearing is tightened in threaded engagement with said socket at said first rod end, a clamping force is created between said socket, said first jam nut, and said first rod end bearing stud, and wherein as said second rod end bearing is tightened in threaded engagement with said socket at said second rod end, a clamping force is created between said socket, said second jam nut, and said second rod end bearing stud.

* * * * *